Nov. 1, 1955 T. F. PETERSON 2,722,393
REINFORCEMENT AND SUSPENSION OF LINEAR BODIES
Filed June 8, 1951 5 Sheets-Sheet 2
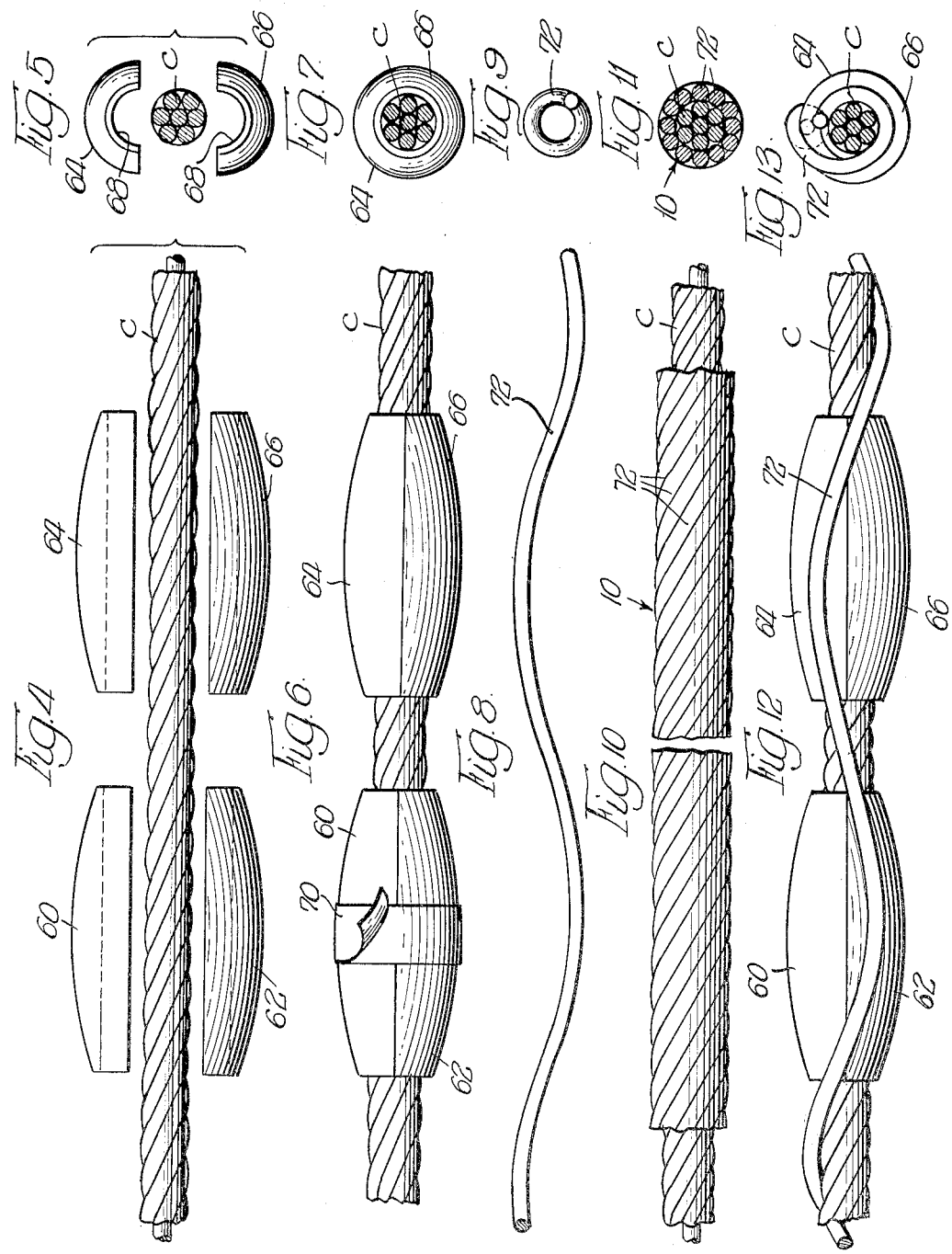
INVENTOR.
Thomas F. Peterson,
BY

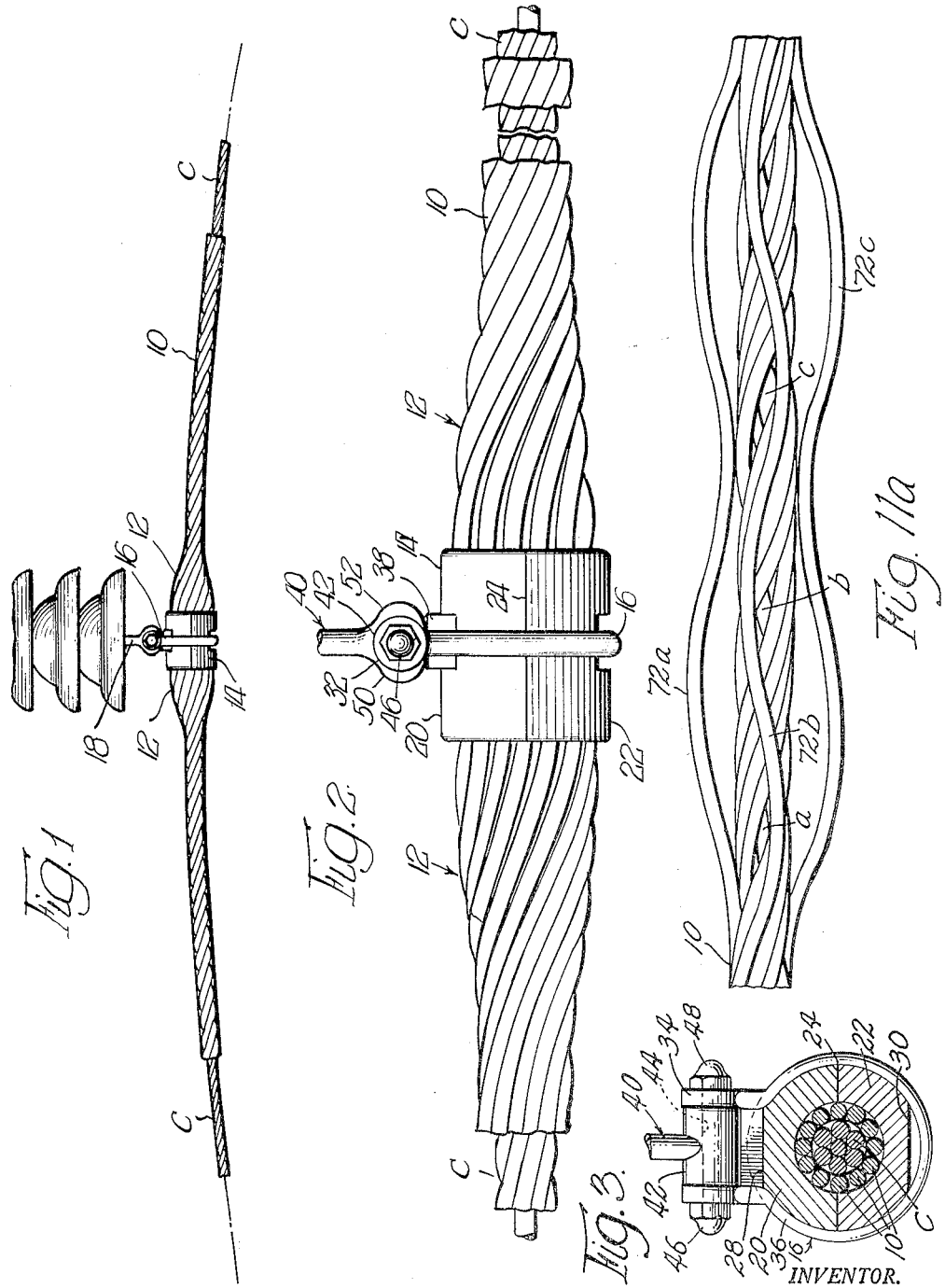

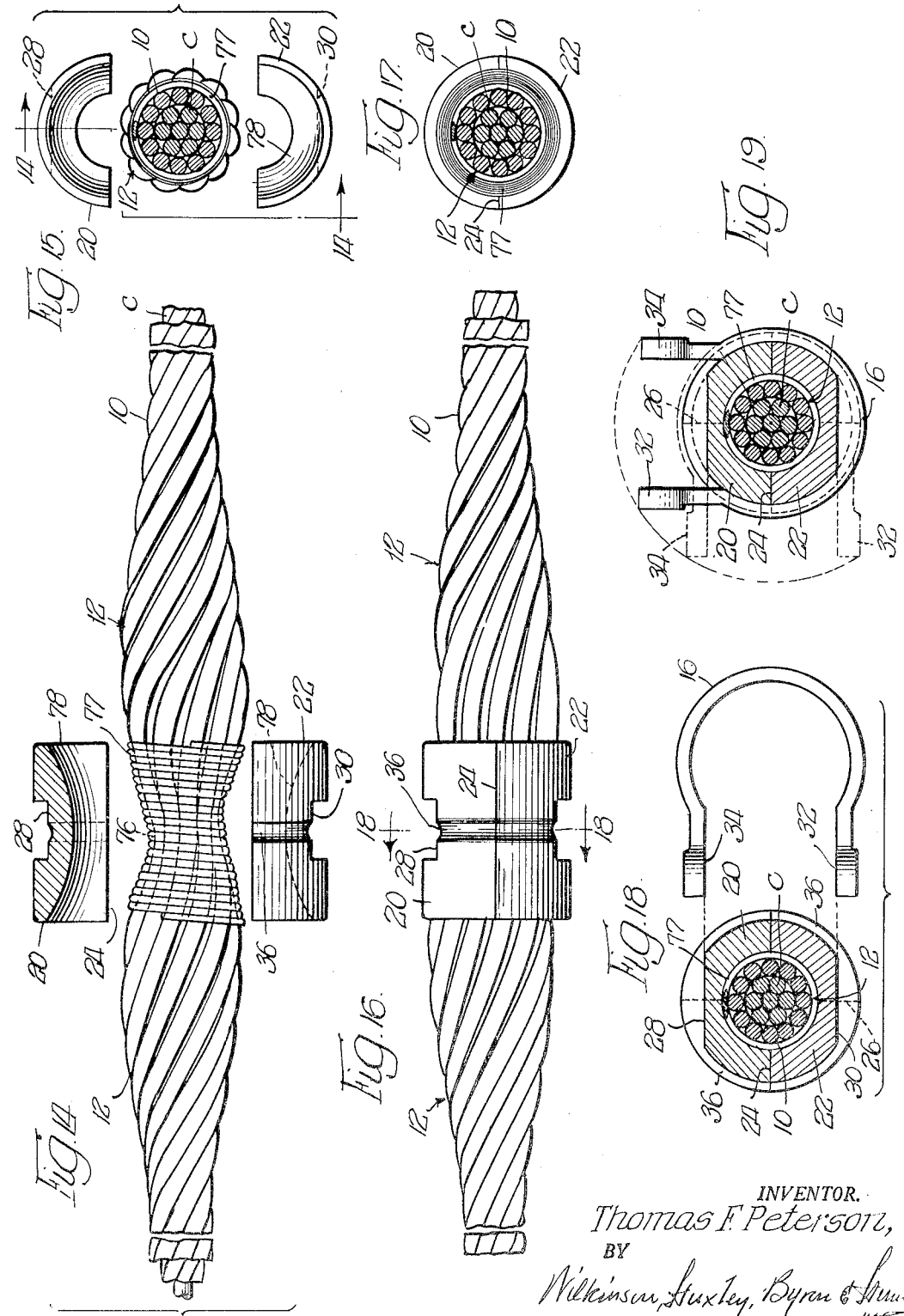

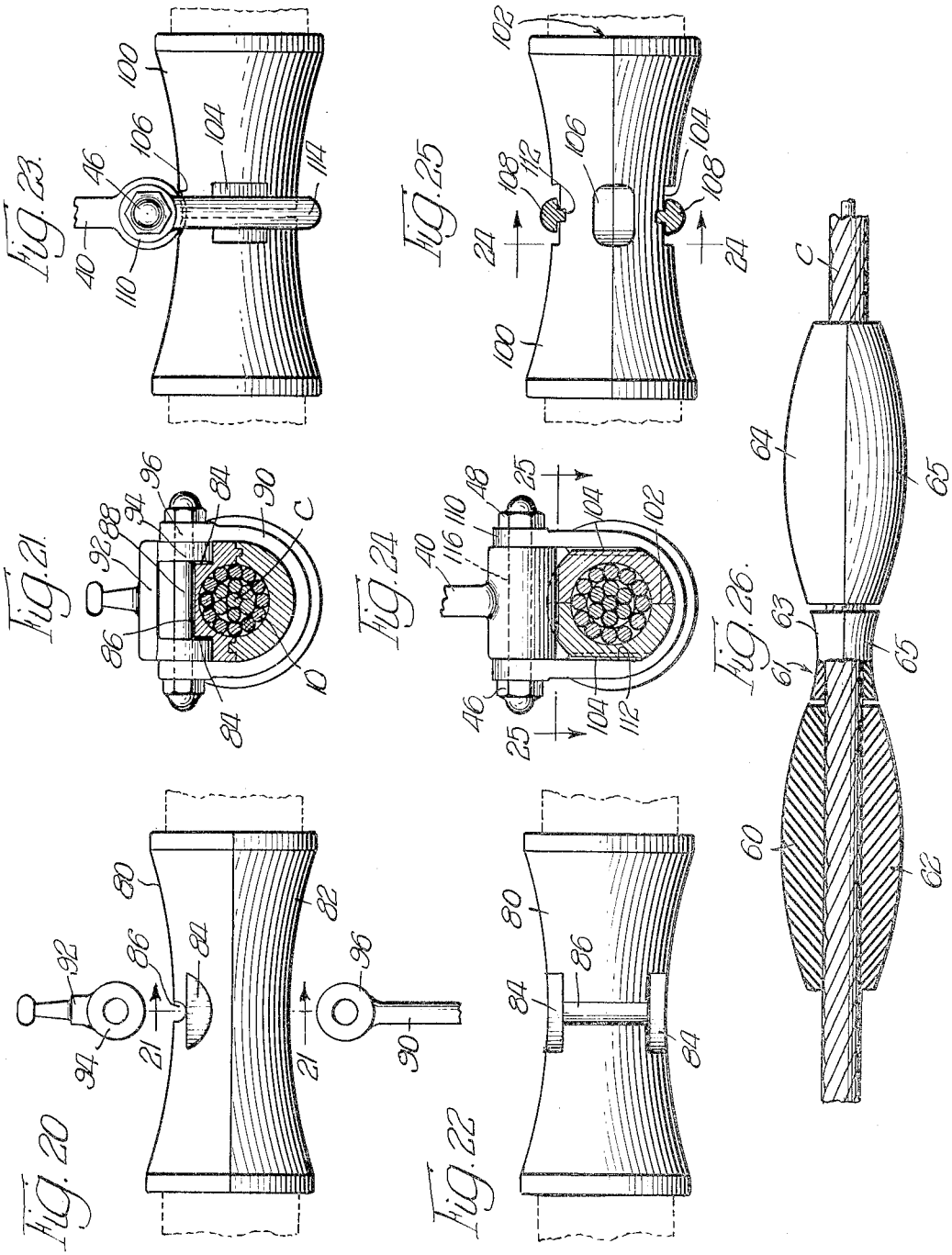

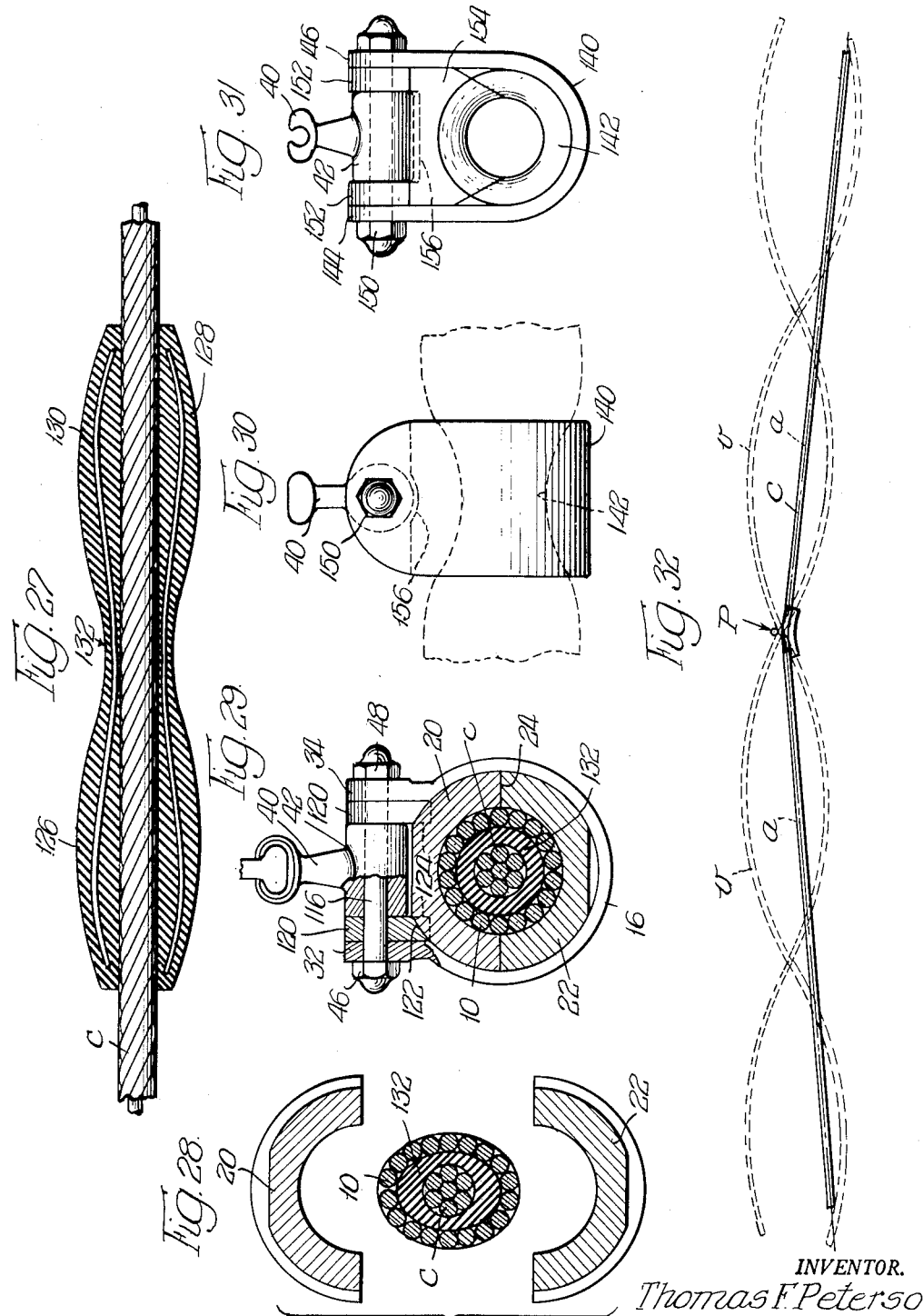

United States Patent Office 2,722,393
Patented Nov. 1, 1955

2,722,393

REINFORCEMENT AND SUSPENSION OF LINEAR BODIES

Thomas F. Peterson, Shaker Heights, Ohio

Application June 8, 1951, Serial No. 230,592

19 Claims. (Cl. 248—63)

This invention relates to the reinforcement and suspension of linear bodies, such, for example, as electrical transmission lines, and to the attachment of fittings to cables and the like.

It is concerned with the utilization of helically-preformed armor rods as reinforcements for suspended conductors in such a way that said rods are a constituent part of the means by which said conductors are held in suspension.

The subject matter hereof is related to, and partially continues, that which is disclosed in my co-pending application Serial No. 89,986, filed April 27, 1949, and in one particular reverts to an aspect of the disclosure contained in another co-pending application of mine, Serial No. 698,312, filed September 20, 1946, as will appear hereinafter.

In the former application mentioned above, helically-preformed armor rods are employed in association with protuberating means which are placed on the conductor before the armor rods are installed thereon, so as to be enveloped by the armor to provide bulges or protuberances therein. These protuberances are used as bearing points for sockets which are applied over the armored portion of the conductor to support the latter against axial movement and to provide means for attachment to the external supports. In all embodiments except that shown in Figures 36 and 37 in my prior co-pending application, Serial No. 89,986, the armor rods are distorted to the larger diameter of the protuberating means around which they are disposed, and in the accommodation of which the pitch angle of the armor rods is considerably shortened, and the parting between the rods is opened across the bulge. The rods return to their normal pitch and arrangement at each side of such bulge in normal engagement with the conductor.

Figures 36 and 37 of my co-pending application Serial No. 89,986 relate to a different placement of the helically-preformed armor rods, which is the same as that shown at Figure 15 in my application Serial No. 698,312 referred to above. In this embodiment some of the preformed armor rods are directed from their usual position in surrounding relation to the conductor, so as to extend for one or more pitch lengths in eccentric relation thereto before returning to embrace the conductor. When all of the armor rods are thus diverted, a cage-like formation occurs which constitutes the protuberating means per se, and provides two or more bulges one pitch length apart that are closer together than is possible were the rods to surround the protuberating means as is otherwise shown in my application Serial No. 89,986. Since the present invention contemplates two closely spaced bulges, this latter arrangement of rods is preferred, although it is not intended thereby to preclude the use of protuberating means enclosed by armor rods in surrounding relation where these may be possibly employed in carrying out the present invention.

In its preferred form, this invention contempaltes protuberating means providing two bulges along the length of the cable to be suspended, to which helically-preformed rods are applied, so that the armor at the bumps is diverted eccentrically to form cages within which the protuberating means occur as supporting fillers. Half-bearing shoes of complementary construction surround the waist of the armored section of cable defined by the bugles thus formed and are retained in position by a clevis or an analogous instrumentality which is engaged by the external hanger device of more or less familiar construction. Although the protuberating means is not absolutely essential in carrying out the invention in view of the fact that the helically-preformed armor when diverted eccentrically for one or more pitch lengths is self-sustaining, still greater resistance to crushing forces and forces tending to effect axial displacement of the cable is realized by the use of such protuberating means, whereby their use is recommended. To this extent, the invention combines the several aspects of the disclosure of my prior applications above referred to.

The primary objectives of this invention include the provision of means for reinforcing and suspending conductors which will be effective to hold a suspended line against all loads and to resist axial movement thereof; such a means which will effectively withstand swaying, galloping and vibration; one which will minimize vibration stresses in the conductor and dampen those which do arise; such means which has high corona forming voltage; and one that is low in cost and easily assembled on transmission lines irrespective of whether such lines are energized or not.

These and many similar desiderata are realized from the present invention, preferred embodiments of which are described herein and shown in the accompanying drawings, in which—

Figure 1 is a fragmentary side elevational view showing the reinforced cable suspended from a conventional insulator hanger in accordance with the present invention;

Figure 2 is an enlarged fragmentary view corresponding to Figure 1;

Figure 3 is a partial mid-cross-sectional view of the assembly of Figure 2;

Figure 4 is a side elevational view showing the application of protuberating means to a conductor in accordance with the present invention;

Figure 5 is an end view of Figure 4;

Figure 6 shows the protuberating means assembled upon the conductor;

Figure 7 is an end view of the latter;

Figures 8 and 9 are elevational and end views, respectively, of a helically-preformed armor rod;

Figures 10 and 11 are side elevational and end views, respectively, of a set of helically-preformed armor rods installed upon a conductor;

Figure 11a is a side elevational view of a set of helically preformed armor rods installed on a conductor similar to that shown in Figure 10, in which certain of the armor rods are diverted from the usual helical disposition into an eccentric disposition with respect to the conductor for one or more pitch lengths.

Figures 12 and 13 are elevational and end views, respectively, showing the application of one helically-preformed arm rod applied to a conductor on which the protuberating means of Figure 6 has already been installed;

Figures 14 and 15 are elevational and end views showing a full set of armor rods installed upon a conductor around the protuberating means thereon, and showing half-bearings about to be applied thereto, one of which is shown in section taken along line 14—14 of Figure 15;

Figures 16 and 17 are elevational and end views, respectively, of the devices shown in the immediately preceding figures as assembled;

Figure 18 is a sectional view taken along line 18—18 of Figure 16;

Figure 19 is a view corresponding to Figure 18, showing certain steps in the assembly thereof;

Figures 20 and 21 are elevational and end views, respectively, of a modified form of the invention, the latter being a sectional view of the bearing shoes taken along line 21—21 of Figure 20, showing the instrumentalities in assembled relation therewith;

Figure 22 is a plan view of the device shown in Figure 20;

Figures 23 and 24 are elevational, cross-sectional and plan views, respectively, of the further modification of the invention, Figure 24 representing a section taken along line 24—24 of Figure 25, and the latter representing a section taken along line 25—25 of Figure 24;

Figure 26 is a side elevational view, shown partly in section, of a modified form of protuberating means;

Figure 27 is a fragmentary longitudinal view of another modification of the protuberating means;

Figures 28 and 29 are mid-sectional disassembled and assembled views, respectively, of a suspension assembly embodying an elliptical type of protuberating means similar to that illustrated in Figure 27 and exemplifying further considerations in the clamping and suspension means, per se;

Figures 30 and 31 are further modified forms of hanger shown in side elevation and end views, respectively; and Figure 32 is a diagram of a suspended conductor illustrating certain considerations of the harmonics of the natural vibrations thereof and the optimum condition of suspension appurtenant thereto.

As shown in Figures 1 to 3, a conductor C has a set of helically preformed armor rods 10 applied thereto, which at their middle portion adjacent to the point of suspension, are provided with protuberances 12, between which an encircling bearing 14 is disposed. A clevis or other suitable holding instrumentality 16 is engaged by an insulator suspension 18 of conventional construction.

As shown in Figures 2 and 3, the encircling bearing 14 is composed of a pair of bearing shoes 20 and 22, which in the embodiment shown come together at a horizontal parting 24, but which may in the contemplation of the invention be joined at a vertical parting 102, as is shown in Figure 24.

The bearing shoes are provided with flattened portions 28 and 30 to admit the legs 32 and 34 of the clevis 16 in encircling relation thereto. The clevis is slipped on sideways and turned 90 degrees to present the legs in a vertical position. The annular body portion of the clevis is accommodated in a complementary groove 36, which connects the flattened portions 28 and 30 around the circumference of the assembled bearing shoes. A filler block 38 is optionally provided to seat within the flattened portion 28 on top of the bearing shoes and to underlie a suspended arm 40, which has a journal portion 42 of an axial extent designed to fill the spacing between the clevis arms 32 and 34, and which has a bore 44 within which a bolt or pin is extended and held in position by the members 46 and 48 engaging the outside portions of the clevis arms.

The journal 42 may be elliptical, to provide cam projections 50 and 52 in diametrically opposed positions horizontally of the journal, so that any movement of the arm 50 about the pivotal axis of the pin causes a binding between the journal and the filler block 38 and places the clevis arms under tension. This serves to prevent the suspending lever 40 from turning substantially from the vertical, and further serves to draw the bearing shoes and associated parts together under additional compression where the space between the parting 24 of the shoes permits this to be done. The manner in which this assembly is installed will now be described in connection with Figures 4 to 19.

As shown in Figures 4 to 7, the conductor C at the point of suspension is provided with two pairs of protuberating means 60—62 and 64—66, which are in the form of half-bearings of complementary size and shape, having cable accommodating recesses 68 at their internal confronting portions. These protuberating means may be comprised of rubber, neoprene, or other suitable plastic molded compositions, or they may be of wood or metal, as preferred. It is contemplated, however, that rubber or plastic bodies be employed for this purpose, which have an overall length agreeing approximately with one pitch length of the helically-preformed armor rods to be associated therewith, and which are curved convexly from the cable of association to the point of maximum diameter and gradually back to the cable again, so as to avoid abrupt changes in dimensions.

The internal cable bearing recesses 68 may be of a size snugly to engage the cable and thus to be self-retaining thereon, as shown in Figures 6 and 7, or, if desired, a piece of adhesive tape 70 may be wrapped therearound to retain the protuberating means in position upon the cable during the assembly operation.

In Figures 8 and 9, there is shown a single helically-preformed armor rod which finds application in devices constructed in accordance with the present invention, and which is similar to that shown in my co-pending application above identified, as well as others referred to in such applications.

It will be seen that the armor rod is composed of a length of wire or rod 72, which is preformed with an internal helical diameter that is equal to about 85 per cent of the external diameter of the conductor C of association. The pitch length of the armor rods is sufficiently great to permit application of the latter from the side of the conductor by deforming the rod well within its elastic limits until it assumes a position in embracing relation to the conductor, which it firmly grips. A complete set of helically-preformed armor rods 10, the individual components of which are similar to that shown in Figure 8, may be disposed upon the conductor C to enclose the latter, as shown in Figures 10 and 11. This is conventional treatment, and may include sufficient armor rods completely to enclose the conductor, or a fewer number thereof down to as few as two, which are preferably disposed in symmetrical balance around the periphery of the conductor as regarded in right section, in order that the forces resident in the armor when sprung in position around the conductor will tend to offset each other without causing the conductor to be bent to conform to the rods.

As shown in Figure 1, the rods are extended in embracing relation to the conductor for a substantial distance to each side of the point of suspension.

As appears in Figure 11a, protuberances may be formed upon the conductor by diverting two or more armor rods up to and including the entire amount into an eccentric disposition with respect to the conductor. This is preferably done so that the armor rods are symmetrically disposed in balanced relation around the conductor in order that the forces set up by the deflected armor rods may counteract each other without deflecting the conductor. Thus, in the illustration, it will be seen that rods 72a, 72b and 72c are diverted from their normal position in the lay of the complete armor rod envelope 10 to provide blank lays a, b and c, respectively. The diverted elements are extended in eccentric relation to the conductor for a distance of one or more pitch lengths until each again comes into a position of registration with the blank lay which it had been forced to vacate, at which point it is returned to assume its normal concentric position with respect to the conductor in the lay of the enveloping armor. Two or more armor rods deflected in this manner, in and of themselves, form protuberances for carrying out the purposes of this invention, as has been referred to above, without regard to any internal supporting fillers or protuberating means, as will now be described.

As indicated in Figures 12 and 13, after the conductor C is provided with the protuberating means as shown in Figures 4 and 6, the armor is applied thereto, either one at a time, as indicated in Figure 12, or in amounts up to a full set, depending on how many are used, which may be laid around the protuberating means in bridging relation thereto and twisted along the conductor at each side thereof until they are in embracing relation to the latter.

As shown in Figure 1, the full amount of armor rods has been applied to completely enclose the conductor. At the central portions adjacent the protuberating means, the armor rods are not in encircling relation to the conductor, but are permitted to lie to one side thereof in eccentric relation, as appears in Figures 12 and 13. The natural curvature of the rods forms a cage around the conductor as shown in Figures 14 to 17, within which the protuberating means lie as fillers or bearings for the eccentric portions of the armor rods. There are thus provided bulges or protuberances 12 on the conductor, as previously mentioned, having a constricted waist 76 which the half-bearing shoes 20 and 22 are adapted to encircle. The inner faces of the bearing shoes 78 are convex and generally conform to the shape of the waist 76 between the bulges 12 on the armored conductor. As appears at Figure 16, the bearing shoes are closed around the waist portion 76 and a clevis 16 is slipped into engagement therewith horizontally, as shown in Figure 18, which is permitted by the flattened portions 28 and 30, already mentioned, giving clearance for the legs 32 and 34 of the clevis.

The clevis is slipped on as shown in Figures 18 and 19, and then turned 90 degrees, as shown in the latter figure, to hold the bearing shoes in closed position around the armored conductor, without other clamps or fastening means being required. As stated in the fore part of this description, the parting 24 between the bearing shoes may be disposed in the vertical, as shown at 102 in Figure 24, and the clevis will be as effective in maintaining the parts in closed relationship where this construction is adopted.

It is sometimes desirable to provide for a serving or lashing 77, shown in Figure 14, around the waist portion 76 of the armored protuberances. This serving or lashing, while it may be of any suitable flexible stuff, is preferably a wire of soft metal, like soft annealed galvanized wire, soft aluminum, copper, or brass, which may act as a bearing liner for the encircling bearing shoes to insure a snug fit for the shoes and to act as a retainer for the armor rods preparatory to the placement of the shoes. By applying more or less serving, a greater number of sizes of armored conductor with protuberances may be accommodated for a given size of bearing shoes than would otherwise be possible. Also, a replaceable bearing liner is thus provided to take the wear which would be sustained by the bearing shoes and armor rods themselves. To the same effect, other forms of liners may be employed, as for example, suitably formed soft sheet metal or plastic composition may be applied around the waist of the armored conductor or to the bearing shoes, as bushings or liners therefor.

In Figures 20 to 22, there is shown a modified form of bearing means for encircling the waist of the armored conductor as previously described, and in this and ensuing embodiments an effort has been made to bring the pivotal point of transverse suspension, which is defined by the clevis pin in the foregoing description, as close as possible to the central axis of the conductor encircled thereby. To this end, a pair of bearing shoes 80 and 82 is provided, with a relieved portion 84 at each side of the top or uppermost bearing shoe, and a transverse slot 86, which extends between the relieved portions to accommodate the clevis pin 88, as appears in Figure 21. In this embodiment, the clevis 90 is of semi-circular construction and is adapted to pass around the waist portion of the bearing shoes without regard to any special grooves or flat portions for its accommodation. An inverted clevis 92 has journals 94 contiguous to the journals 96 on the first mentioned clevis, which are accommodated in the relieved portions 84 in the upper bearing shell 80. In this position they are aligned with the journals 96 of the clevis 90, as well as with the slot 86 across the top portion of the bearing shoe, so that the pin 88 may pass therethrough to connect all parts together along an axis that is at the closest practicable position to the central axis of the conductor being suspended.

In the embodiment shown in Figures 23 to 25, a pair of bearing shoes 100, divided along a vertical parting 102, is provided with diametric flattened portions 104 at each of their sides. At the top portion of each, a concave depression 106 is provided in order to give clearance for the lever arm assembly, which is disposed therein, as will later appear. The clevis 108 is provided with a conforming curved bottom portion with relatively straight leg portions attached thereto, which are afforded clearance by the flattened portions 104 at the opposite sides of the bearing shoes. To center the legs of the clevis relative to the flat portions, small grooves 112 are provided centrally thereof so as to accommodate the ridges 114 which occur on the inner faces of the clevis legs, and which register in these grooves to prevent relative motion between the parts axially of the assembly. A hanger arm 40, which is the same as appears in Figures 2 and 3, is held in position between the clevis journals 110 by a pin 116 shown in dotted lines, which is retained in place by the end fittings 46 and 48 as previously described. The journal portion of the suspending arm is accommodated in the depression 106 on top of the casing so as to dispose the axis of the pin 116 as near the central axis of the conductor as is practicable. In such an arrangement, it will be understood that the forces tending to displace the conductor axially are given the least mechanical advantage with respect to the suspending means by minimizing the lever arm, represented by the dimension from the center of the conductor to the axis of the clevis pin.

Another important function attributable to the placement of the pivotal axis of the pin proximate to the axis of the cable is illustrated in Figure 32. The axis $a$ of the suspended conductor C in the catenary loops adjacent the support intersect at point P if projected without regard to the reverse bend of the conductor over the support. The point P is a nodal point of the natural vibratory period of the conductor illustrated in broken lines by the sinusoidal loops $v$ in this figure. The axis of the pin 116 is arranged substantially to coincide with this nodal point so that the support may oscillate back and forth as indicated in accommodation of the natural harmonics of the vibrating conductor. The cams 50—52 on the journal 42 of the supporting arm are such as to permit this movement unrestrictedly, and only in the event of a complete line failure at either side of the support will the angular deflection of the conductor cause either of these cams to engage the shoes and strongly bind them together in opposition to the augmented axial load thus sustained.

In Figure 26 there is shown protuberating means similar to that already described in connection with Figures 4 and 5, which, however, are provided with an intermediate bearing member 61 which is made of two complementary halves 63 and 65 in the same manner as the adjacent protuberating means. The element 61 is of concave curvature and carries through the general waist conformation afforded by the protuberating means, and acts as a spacer for the eccentric portions of the armor rods disposed thereon so as to prevent chafing or abrading of the conductor at the place where the armor rods might otherwise come into engagement therewith. In this manner a complete filler between the conductor and all eccentrically disposed portions of the armor rods is thus realized.

In Figure 27 there is illustrated a modified form of protuberating means in which two elongated half elements 126 and 128 are closed about the conductor C so as to provide two protuberances longitudinally of the conductor in connected relation.

The elements 126 and 128 may be internally reinforced by wires or rods 130, which may, or may not, constitute segments of helically-preformed armor rods. The waist portion 132 is preferably elliptical in cross section for reasons presently to be explained. The elliptical cross section of the protuberating means may apply equally to the construction of Figure 26 and the constructions of Figures 4, 6 and 12, if desired.

Referring to Figures 27 and 28, there is here disclosed a conductor C having protuberating means with an elliptical waist portion 132, which disposes the helically-preformed armor 12 in elliptical cross-sectional disposition shown in Figure 28. The usual half-bearing shoes 20 and 22 have internal bearing portions that are of circular section, the diameter of which when assembled is greater than the short cross-axis of the ellipse shown in Figure 28, and less than the long axis thereof. The bearing shoes 20 and 22 are forced to close around the armored elliptical protuberance, whereby the long axis of the ellipse is compressed to a dimension that corresponds to the internal diameter of the assembled bearing shoes, which at the same time causes the short axis of the ellipse to expand to fill the internal bearing area of the bearing shoes, as shown in Figure 29.

The shackle or clevis is then applied as previously mentioned in connection with Figures 18 and 19, and is turned to hold the bearing shoes together, which are under considerable expansive force by the distortion of the elliptical cross-section of the armored protuberance into the circular form as shown in Figure 29.

In the construction shown in Figure 29, a pair of spacer elements 120 is inserted between the clevis bearings 32 and 34 and the journal portion 42 of the hanger arm 40. These spacers 120 are of sufficient height to bear upon the shoe 20 at its upper surface, either by being formed as at 122 to conform to the cylindrical surface of the latter, or else squared to be seated in notches 124 cut out of the body 20, as is shown in broken lines in this figure. In any event, the expansive forces acting to separate the shoes are transmitted upwardly through the spacers 120 to the clevis pin 116, to the effect that the hanger arm 40 and its journal portion are maintained in spaced relation to the shoe 20 in normal operating position, and may freely turn without binding among the several assembled parts.

The construction places the axis of the clevis pin 116 proximate to the axis of the cable C and provides coincidence with the nodal point P discussed previously in connection with Figure 32.

The elliptical construction and the radial stresses realized therefrom cause the several parts to be held firmly against longitudinal slippage, although a predetermined slip factor may be provided for by varying the extent of the elliptical departure in relation to the true cylindrical areas of the bearing shoe. A corresponding adjustment of the slip strength is made in the armor rods themselves by preforming the helices thereof to grip the conductor to any desired predetermined extent. If the slip strength is exceeded, the conductor is permitted to slide through the entire assembly without causing failure of any of the parts.

In Figures 30 and 31 there is a further modified form of suspension shoe, which in this instance comprises a U-shaped half-bearing 140 having a bell-mouthed portion 142 in its bight and upstanding legs 144 and 146. This, in effect, is a combination of a half-bearing shoe and the shackle or clevis previously described.

A clevis pin 148 is disposed between the upstanding arms and is secured therein by round headed fastenings 150. Spacers 152 may be provided to bear against a keeper 154, by which the lower bearing portion 142 is closed. The hanger arm 40 is integrally connected to its journal portion 42, which is of a size and shape to extend into a declivity 156 provided in the surface of the keeper so that as the arm is maintained in the vertical position, as occurs when it is normally attached to an insulator suspension, the bottom portion of the journal 42 extends into the declivity 156 to prevent the axial displacement of the keeper in relation to the other parts.

Flexibility of helical bodies derives from the distribution of the bending forces around the central axis whereby the compressive forces on the inside of the bend are equal and opposite to the tension forces at the outside of the bend, and vice versa. Where the preformed helical armor rods are displaced eccentrically in relation to the central axis of a conductor as occurs at the protuberating means herein disclosed, such distribution of the bending forces is precluded along the particular axial extent of the conductor involved, and such rods each constitute compression-tension members throughout their eccentric portions, which stiffen the assembly at and immediately adjacent to the suspension means. Such stiffening is in addition to that normally derived from the encircling rods which is realized in consequence of the augmentation to the mass and strength of the conductor afforded by the armor rods per se. The assembly is thus held relatively rigidly at and immediately adjacent to the point of suspension, which is graded into the more flexible, though strongly reinforced, contiguous parts of the coaxially disposed armor. Further grading toward the extremities of the armored portions may be had by staggering the ends of the rods axially of the conductor so that complete reinforcement is had up to some point between the point of suspension and the ends of the reinforced portion, beyond which less rods are continued, and finally only one or two rods extend along the conductor at the extremities of the reinforced portion.

The armor rods, being of smaller internal helical diameter than the conductor of association, grip the latter forcefully and prevent relative axial movement therebetween, while, at the same time, they are the means whereby the protuberances are secured to the cable in stationary relation thereto. The clamps or bearing shoes have small internal diameters which encircle the waist of the armored conductor between the bulges, so that the greater diameter of the latter cannot pass therethrough, and the encircling bearings are thus made fast against axial displacement. The external hanger means, when engaged with such bearings must therefore hold the cable or conductor securely against axial movement, while the armor rods minimize bending of the conductor and give maximum "saddle effect" therefor, notwithstanding the minimal dimensions of the bearing shoes, per se, axially of the conductor.

All of the associated parts have rounded corners and edges, and are of an irreducible minimum as to size and number of parts. The overall effect is of a smooth conductor slightly enlarged at the point of suspension, which enlargement is attained and receded from gradually and without abrupt discontinuities which create points for the development of corona discharges. This makes for maximum electrical efficiency while providing the maximum mechanical strength as to holding power, and affords the greatest absorption of vibration stresses which usually reduce the fatigue life of such conductors.

In suppression of corona discharge, the protuberating means shown throughout this specification, while made of any suitable material, preferably of neoprene, rubber, or the like, may be made semi-conducting by the introduction of carbon of metal powder into their constituency, or may be metalized upon their outer surfaces. The conductivity thus provided relieves electrical stress at the points where the armor rods are separated from one another over the protuberating means as at 12 in Figures 2, 14, etc. Where the metalized embodiment is used, this may be accomplished by a metal foil applied over the surfaces of the protuberances, or may be developed by having a thin skin of rubber on the outer surfaces charged with aluminum powder, which will reduce temperatures developed by a combination of sunshine and current loading of the conductor, thus to assist in the preservation of the constituent materials, especially where rubber is used.

As previously stated, the elimination of nuts, bolts, sharp edges, etc., between the conductor and the suspending insulator assembly provides streamlined curved surfaces in which there are no points of high electrical stress concentration, wherefore the voltage at which visible corona and radio interference develop is very high. Moreover, because of the rather bulky cylindrical size of the protuberated armor and clamp, the electrical capacity between the armor and the insulator suspension means is altered so as to relieve the bottom insulator of undue electrical stresses without the use of shielding rings, etc., as are commonly employed.

Semi-conducting protuberances further assist in the suppression of corona discharges, as has already been mentioned, but even where the armor rods are spaced without the benefit of such semi-conducting materials, there is no great corona problem, since the average diameter at this point is from three to four times the diameter of the conductor, whereby the electrical stress around the external diameter of the protuberated armor and clamp is approximately one-fourth of that around the conductor itself.

I claim:

1. Means for suspending linear bodies which comprises, in combination, a line to be suspended, a plurality of helically-preformed armor rods surrounding said line in gripping relation, portions of said rods being disposed to constitute a pair of protuberances in said rods around said line, and means for encircling said rods and line between said pair of protuberances, said encircling means being formed to an internal diameter that is approximately equal to the over-all diameter of said rods and line between said protuberances but less than the over-all diameter of the latter.

2. A suspension system for cables and the like comprising, in combination with a cable to be suspended, a plurality of helically-preformed reinforcements, protuberating means encircling said cable and held thereto by said reinforcements, said reinforcements encircling said cable to each side of said protuberating means in gripping relation and passing eccentrically to said cable across said protuberating means to define a pair of armored bumps having a waist portion therebetween, and a bearing clamp encircling said waist portion having means associated therewith for attachment to an external support, said bearing clamp having an internal diameter approximating the over-all diameter of said waist portion but less than the over-all diameter of said bumps.

3. The invention of claim 2 in which said protuberating means comprises a pair of convex cylinders, said cylinders each having a central cable-accommodating bore extending axially therethrough, and a side parting communicating therewith to admit a cable into said bore.

4. The invention of claim 3, said protuberating means being formed of a resilient substance, said convex cylinders being joined together at said waist portion, said joined waist portion being elliptical in cross-section.

5. The invention of claim 2 in which said bearing clamp comprises a pair of complementary shoes having waist-conforming portions at their interior surfaces, and opposed, parallel flattened portions upon their exterior surfaces, said flattened portions defining the least diametric dimension of said clamp, a clevis having a clamp encircling body and a pair of legs extending in parallel from said body portion, the spacing between said legs being less than the diametric extent of said clamp at all cross dimensions except said least diametric dimension between said flattened portions, and being substantially equal to the latter.

6. A suspension system for wires, strands, cables, and the like, in combination with helically-preformed armor rods for enclosing an axial extent of cable, means for interposition between said rods and cable for constituting armored protuberances on said cable, a U-shaped bearing of an internal dimension less than the outside dimension of said protuberances partially encircling said armor rods between adjacent protuberances and being conformal with respect thereto, a closure for said U-shaped bearing to confine the armored cable therein, and external hanger engaging means associated with said bearing and closure to suspend the assembly and to maintain the assembled relationship.

7. A suspension system for wires, strands, cables, and the like, in combination with helically-preformed armor rods for enclosing an axial extent of cable, means for interposition between said rods and cable for constituting a pair of armored protuberances thereon, a pair of complementary bearing shoes having interior surfaces confronting the armored cable between said protuberances and being conformed therewith and centered with respect thereto, said shoes having the least overall diametric dimension intermediately of their ends, a clevis engaging said shoes around their least diametric intermediate dimension to hold them together, a pin closing said clevis, and a hanger arm attached to said clevis by said pin.

8. A suspension system for wires, strands, cables, and the like, in combination with helically-preformed armor rods for enclosing an axial extent of cable, means for interposition between said rods and cable for constituting a pair of armored protuberances thereon, said means comprising a pair of convex cylindrical bodies bored for coaxial disposition about the cable and divided longitudinally along a diametric plane to admit the cable therein, said bodies being held to said cable by said armor rods which form a constricted waist portion therebetween, a two-part bearing encircling said waist portion and being held against movement axially of the cable by said protuberances, a circumferential groove extending around the exterior of said bearing at a central portion thereof, and a clevis of a size and shape to conform to said groove when seated therein being effective to hold the bearing and encircled parts together, and a pin for closing said clevis.

9. The invention of claim 8 in which said bearing is recessed in chordal relation to said circumferential groove for the accommodation of said clevis pin in close proximity to the cable being suspended.

10. The invention of claim 8 in which said armor rod helices are coaxial with said cable for a substantial axial extent to each side of said armored protuberances and are eccentric with respect thereto across said cylindrical bodies and constricted waist portion.

11. In a cable suspension system according to claim 2, in which said bearing clamp is a radial and axial cable bearing element comprising a pair of bearing shoes of complementary size and shape, said shoes having interior cable encircling bearings of least diameter at the central portions thereof, and of gradually increasing diameters to each side of the central portions to define flared bellmouth entrances on said bearing element, the exterior walls of said element being of least circumferential extent around the middle portion thereof and having opposed flattened portions at each side of said middle portion constituting a part of the least circumferential dimension thereof, and a clevis having an annular body portion of an internal diameter substantially the size of said least circumferential dimension and having an opening therein smaller than the average diametric dimension of the latter but substantially equal to the dimension between said flattened portions, legs extending from said annular body portion on said clevis at each side of the opening therein in substantial parallelism, and pin receiving bearings carried at the outer extremities of said legs in coaxial alignment.

12. The invention of claim 11 in which said pin bearings are common to an axis that passes in chordal relation to the exterior curvature of the bearing element lying therebetween, said element being recessed along said axis to accommodate a pin extending between said pin bearings.

13. The invention of claim 12 in which an inverted clevis having pin bearings in coaxial alignment with the pin bearings of the first clevis is disposed between the latter, said bearing element being relieved at each end of said pin accommodating recess to afford openings in which the pin bearings of the inverted clevis are accommodated.

14. In a cable suspension system according to claim 2, in which said bearing clamp is a radial and axial cable bearing element comprising a pair of bearing shoes having when assembled an internal bore to receive an armored cable, said bore being of least cable encircling dimension at the central portions thereof, and flaring outwardly to constitute bellmouthed entrances therein, the exterior surfaces of said shoes being of least circumferential dimension around their mid-portions, and a U-shaped clevis element conformal with said least circumferential dimension disposed in straddling relation thereon to lock said shoes together.

15. The invention of claim 14 in which said bearing shoes at each side are flattened to accommodate said clevis, and said clevis has straight parallel legs in engagement with said flattened portions.

16. The invention of claim 14 in which the extremities of the clevis legs project upwardly in assembled relation, and terminate in pin bearings, and a hanger arm having a pin-receiving bearing disposed between the pin bearings on said clevis legs, and a pin passing through all of said bearings to fasten them together.

17. The combination of a conductor, protuberating means applied upon said conductor, helically-preformed armor rods surrounding said conductor at each side of said protuberating means and bridging the latter to constitute a pair of armored protuberances on said conductor with an armored waist therebetween, said armored waist being elliptical in cross-section, a pair of bearing elements having an internal bore when assembled of circular section for encircling said waist, the cross-sectional area and cubic volume of said elliptical waist and the circular bore of said bearing elements being substantially equal as to the coextensive, conforming parts, and means for closing and holding said bearing elements in closed relation around said waist.

18. The invention according to claim 17, said closing and holding means comprising a shackle engaging said bearing elements around the outside surfaces thereof, the legs of said shackle extending normal to the parting between said bearing elements and parallel to the greater elliptical cross-axis of said armored waist, a bolt connecting the legs of said shackle, a hanger arm impaled on said bolt adjacent to its middle, and a pair of spacer elements disposed at each side of said hanger arm between the latter and the legs of the shackle, said spacer elements bearing at one end upon the proximate bearing element and having portions in bearing engagement upon said bolt, said shackle, bolt, and spacer elements co-operating to maintain said bearing elements in closed position against the bias of the distorted ellipse of said armored waist portion, and to maintain said hanger arm in freely pivoting relation upon said bolt.

19. An axially fixed clamp for cables and the like which comprises, in combination with a cable, a plurality of helically-preformed armor rods encircling said cable in tightly gripping relation, said armor rods being disposed at a portion intermediate their lengths to constitute a pair of protuberances around the cable in axially-spaced proximity to each other, and a clamp disposed around said cable and armor rods between said protuberances so as to be confined by the latter against substantial movement axially of said cable, the internal diameter of the clamp being less than the over-all diameter of the protuberances.

References Cited in the file of this patent

UNITED STATES PATENTS

| | | |
|---|---|---|
| 1,155,460 | Barbour | Oct. 5, 1915 |
| 1,173,400 | Willson | Feb. 29, 1916 |
| 1,799,114 | Miller | Mar. 31, 1931 |
| 1,841,292 | Lark | Jan. 12, 1932 |
| 1,873,798 | Varney | Aug. 23, 1932 |
| 1,902,009 | Austin | Mar. 21, 1933 |
| 2,412,941 | Bannermann et al. | Dec. 24, 1946 |
| 2,587,521 | Peterson | Feb. 26, 1952 |